UNITED STATES PATENT OFFICE.

PHILIPPE CHARLES SOYEZ, OF PARIS, FRANCE.

NON-INTOXICATING BEVERAGE.

1,291,219.     Specification of Letters Patent.     Patented Jan. 14, 1919.

No Drawing.     Application filed January 8, 1918. Serial No. 210,811.

*To all whom it may concern:*

Be it known that I, PHILIPPE CHARLES SOYEZ, a citizen of France, residing at Paris, France, have invented new and useful Improvements in Non-Intoxicating Beverages, of which the following is a specification.

This invention relates to non-intoxicating beverages and the object of the invention is to provide a beverage of this class having the appearance and general taste of lager beer, and which may be commercially classifiable as a "near beer".

To the attainment of the foregoing, the invention consists in the beverage hereinafter described and definitely claimed.

In carrying out my invention, for approximately 100 quarts of the product, I employ the following ingredients in substantially the proportions given:

| | |
|---|---|
| Leaves of ash-tree | 500 gr. |
| Sugar | 1500 gr. |
| Tartaric acid | 80 gr. |
| Chicory | 120 gr. |
| Yeast | 125 gr. |
| Water | 100 qts. |

I proceed by melting the sugar with the tartaric acid in a small quantity of boiling water, infusing the leaves of the ash-tree, preferably the leaves of the well known white-ash tree, for about 2 hours in sufficient boiling water, and boiling the chicory in sufficient water. These solutions are then strained and admitted to a recepatcle and the yeast, which has been mixed with cold water, is then added. The amount of water employed in the preceding steps is in sufficient quantities only to accomplish the desired purpose as is apparent. The yeasted mixture is permitted to rise or ferment for 3 or 6 days, and during fermentation, water is added each day, in equal quantities, preferably except the last day, until the product measures approximately 100 quarts, when the beverage is ready for bottling or other form of packaging and ready for the market.

Experiment has demonstrated that an infusion of ash-tree leaves imparts a piquant and palatable taste to the beverage while lending body thereto; and it will also be understood that the utilization of an infusion of ash-tree leaves to form the major portion of the beverage renders the beverage extremely inexpensive.

The chicory when combined with the infusion of ash-tree leaves, sugar, tartaric acid and yeast gives a taste to the beverage simulating to a considerable degree that of lager beer.

Having fully described the invention, what is claimed as new and desired to be secured by Letters Patent, is :—

A non-intoxicating beverage comprising a major portion of an infusion of ash-tree leaves, sugar and tartaric acid in sufficient quantities to develop an active fermentation, a minor portion of yeast, water, and chicory in sufficient quantity to add a bitterness approximately that of beer and to give color to the beverage.

In testimony whereof I have hereunto set my hand in presence of two subscribing witnesses.

PHILIPPE CHARLES SOYEZ.

Witnesses:
  LUISA DAWSON,
  F. EDWARD MITCHELL.